United States Patent [19]

Jones

[11] 4,402,650

[45] Sep. 6, 1983

[54] VERTICAL AXIS ROTOR

[76] Inventor: Jerry R. Jones, 4445 Tomlinson, Riverside, Calif. 92503

[21] Appl. No.: 282,271

[22] Filed: Jul. 10, 1981

[51] Int. Cl.³ .............................................. F03D 3/06
[52] U.S. Cl. .................................... 416/87; 416/101; 416/197 A
[58] Field of Search ...................... 416/87, 101, 197 A

[56] References Cited

U.S. PATENT DOCUMENTS

| 196,448 | 10/1877 | Harris | 416/197 A X |
| 1,293,262 | 2/1919 | Walker | 416/101 |
| 2,159,653 | 5/1939 | Carlin | 416/197 A X |
| 2,224,851 | 12/1940 | Lea | 416/197 A X |
| 2,850,261 | 9/1958 | Rutkove | 416/101 X |
| 4,019,828 | 4/1977 | Bunzer | 416/197 A X |

FOREIGN PATENT DOCUMENTS

| 1015318 | 9/1957 | Fed. Rep. of Germany | 416/105 |
| 2627906 | 2/1978 | Fed. Rep. of Germany | 416/197 A |
| 2031072 | 4/1980 | United Kingdom | 416/197 A |

Primary Examiner—Everette A. Powell, Jr.

[57] ABSTRACT

A wind-operated rotor, including at least one or more horizontal propellers, mounted along a vertical shaft of a generator secured upon a tower, so as to generate electrical power; a hollow cone secured in opposite directions at the outer ends of each propeller, and means to shift the propeller outwardly at their ends which catch the wind.

1 Claim, 4 Drawing Figures

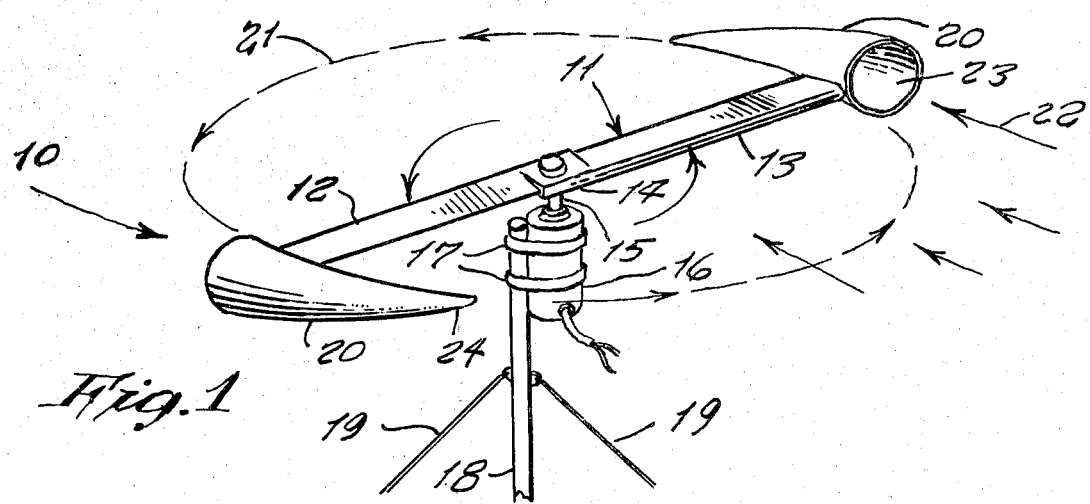
Fig. 1
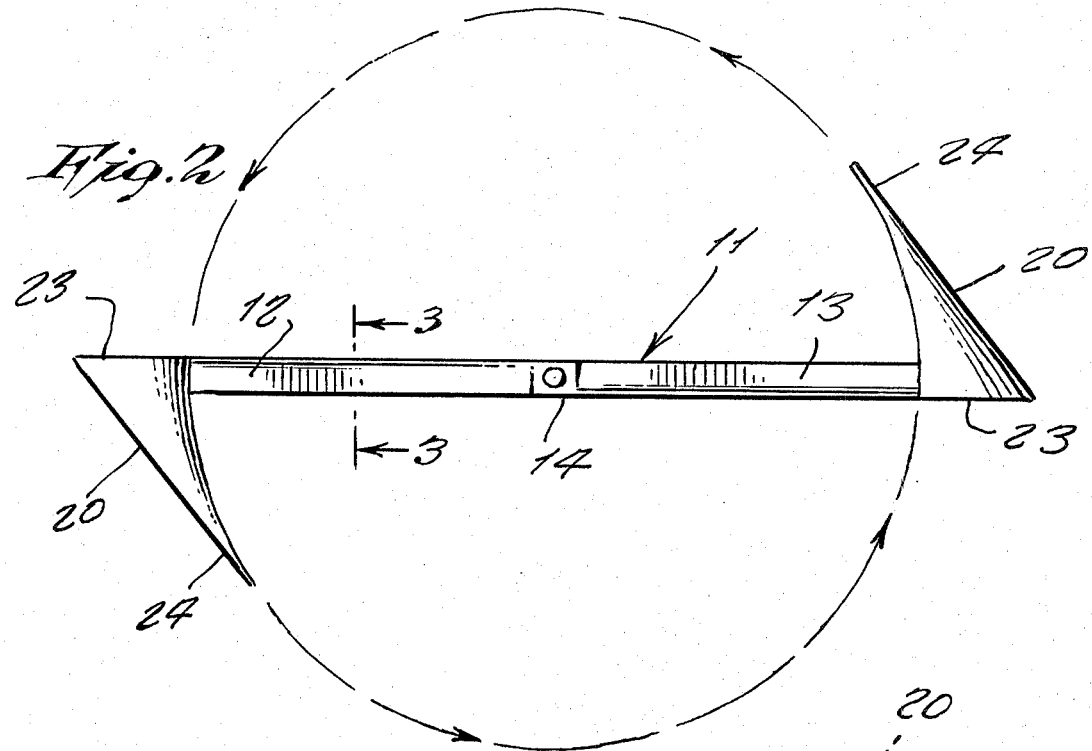
Fig. 2
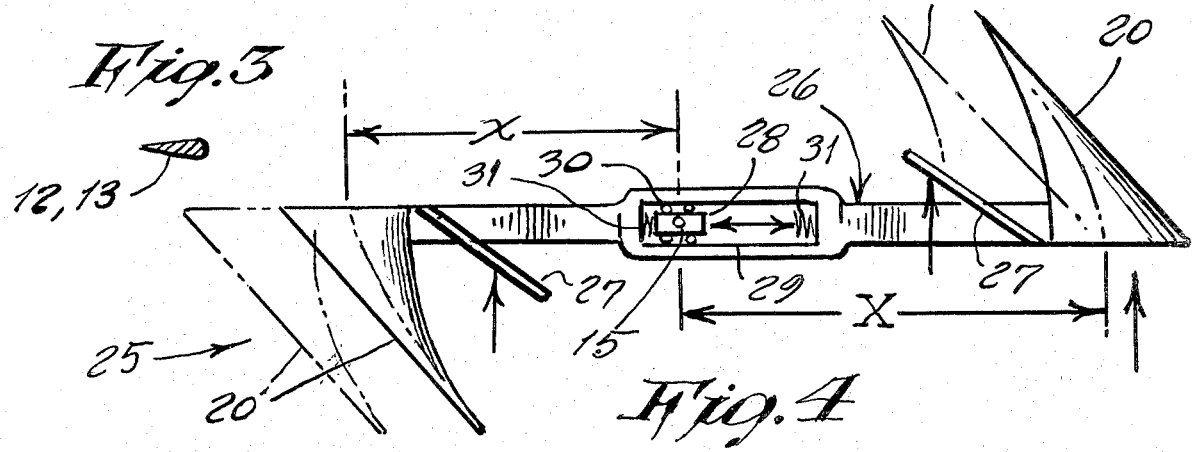
Fig. 3
Fig. 4

VERTICAL AXIS ROTOR

This invention relates generally to energy producing machines. More specifically, it relates to windmills.

It is well known, that harnessing the wind for doing useful work had been done for many hundreds of years, however, in the past, not much concern was given to the efficiency of such equipment, as long as it did the work. With modern interest in greater efficiency, the old and more recently developed wind harnessing devices require further development.

Accordingly, it is a principal object of the present invention to provide a vertical axis rotor, having increased efficiency, by means of a horizontally turning rotor, that is always directly hit by the wind, and wherein the wind drag is at a minimum; the rotor accommodating a changing wind blowing from any direction, without necessitating any changes, accordingly, on the rotor itself.

Another object is to provide a vertical axis rotor, which, accordingly, will run even in a light breeze, and which may be made in any size so as to be suitable for providing energy to either a small farm, or a large municipality, such as a town or city and the like.

Yet a further object is to provide a vertical axis rotor, which may be used in groups of three or more, for further increased energy collection without the rotors interfering with each other for full efficiency.

Other objects of the present invention are to provide a vertical axis rotor, which is simple in design, inexpensive to manufacture, rugged in construction, easy to use and efficient in operation.

These, and other objects, will be readily evident, upon a study of the following specification, and the accompanying drawing, wherein:

FIG. 1 is a perspective view of the invention, shown being rotated by a blowing wind;

FIG. 2 is a top plan view thereof;

FIG. 3 is a transverse cross-sectional view, on line 3—3 of FIG. 2, showing a typical shape of each end of the swinging arm, and FIG. 4 is a top plan view of another design of the above described invention, which additionally includes an inclined vane on each end of the arm, so as to cause the blowing wind to slide the arm horizontally, at each one-half rotation of the arm, into the direction of the cone which is catching the wind, and thus increase its distance from the pivot, for increased leverage force.

Referring now to the drawing in greater detail, and more particularly to FIGS. 1, 2 and 3 thereof, at this time, the reference numeral 10 represents a vertical axis rotor, according to the present invention, wherein there is a propeller 11, having generally flat blades 12 and 13 at each opposite end, and which are angularly inclined transversely to each other. A longitudinal center 14 of the propeller is affixed upon a shaft 15 of an electric generator 16, that is stationarily mounted, by means of bands 17, to an upright tower 18, and which is installed thereupon, so that the shaft 15 extends vertically, and the propeller, swinging about the vertical axis thereof, extends in a horizontal plane. The tower may be installed upon the ground (not shown), and steadied in position by means of guy wires 19.

A rotor element 20, affixed at each opposite end of the propeller, comprises a stiff hollow cone, that is secured at its wide-mouthed end to the blade end, while the tapering end of the cone trails arcuately along a tangent of a circular path 21, followed by the blade outer ends, as the propeller is rotated by wind 22 being caught in the mouth 23 of the cones. As shown, the cones extend into opposite directions, so that, as the mouth of one cone catches the wind, then a closed tapering end 24 of the other cone is moving in a streamlined manner into the wind, so that its resistance force is less than the drive force of the open-mouthed end.

A plurality of such rotor constructions may be carried on a single generator shaft 15, the propeller rotating in horizontal planes, spaced one above another, and the propellers being angularly spaced equally apart in direction, so that a more steady rotation of the shaft is thus obtained.

In a modified design of vertical axis rotor 25, shown in FIG. 4, the propeller 26 includes means so as to shift back and forth longitudinally, once during each rotation, so that, when the open-mouthed end of the cone faces the wind, it is located along a longer pivoting arm X, and the tapered end of the other cone facing the wind is on a shorter pivoting arm x, so that there is a still greater proportional difference between the drive force of the cone open end to the cone tapered end, for a greater efficiency. This is obtained by means of a directionally angular flat blade 27, affixed upon each blade of the propeller, the blades 27 being parallel to each other, so that front and rear sides of the two blades 27 urge the propeller to shift longitudinally in the same direction, when struck by a wind from a common, same direction. In this design, the propeller is not affixed rigidly on the shaft 15, but is slideable thereupon, by means of a block 28, fitted on the shaft, being slideable between opposite ends of an elongated slot 29 along the center of the propeller. Frictional resistance of the block sliding is overcome by ball bearings 30. A compression spring 31, in each opposite end of the slot, cushions the block from a hard striking force against the propeller. Thus, the wind automatically shifts the propeller for increased efficiency.

While various changes may be made in the detail construction, it is understood that such changes will be within the spirit and scope of the present invention, as is defined by the appended claims.

What I now claim is:

1. A vertical axis rotor, comprising, in combination, a horizontal propeller rotating upon a vertical shaft of a generator, and oppositely facing, stiff, hollow cones on the opposite ends of said propeller, said cones being arcuately curved between an open widemouth end thereof, and a closed, tapering opposite end thereof, and means for shifting said propeller back and forth longitudinally, once during each rotation whereby when the open-mouthed end of the cone faces the wind it is located along a longer pivoting arm and the tapered end of the other cone not facing the wind is on a shorter pivoting arm for greater efficiency, and an inclined vane on each end of said arm, so as to cause the blowing wind to slide the arm horizontally, at each one half rotation of the arm, into the direction of the cone which is catching the wind, and thus increase its distance from the pivot, for increased leverage force.

* * * * *